UNITED STATES PATENT OFFICE.

HAROLD F. SAUNDERS, OF BOUNDBROOK, NEW JERSEY, AND LESLIE T. SUTHERLAND, OF MALBA, NEW YORK, ASSIGNORS TO THE GLYSYN CORPORATION, OF NEW YORK, N. Y., A CORPORATION OF NEW YORK.

PROCESS FOR CHLORINATING HYDROCARBONS.

1,362,355. Specification of Letters Patent. Patented Dec. 14, 1920.

No Drawing. Application filed August 31, 1920. Serial No. 407,195.

*To all whom it may concern:*

Be it known that we, HAROLD F. SAUNDERS, residing at Boundbrook, in the county of Somerset and State of New Jersey, and LESLIE T. SUTHERLAND, residing at Malba, in the county of Queens and State of New York, both citizens of the United States, have invented certain new and useful Improvements in Processes for Chlorinating Hydrocarbons, of which the following is a specification.

Our invention relates to the production of chlorin substitution products of propylene and particularly to the production of trichlorhydrin or trichlorpropane. We have found that upon treating the dichlor addition product of propylene, propylene chlorid, with chlorin in the presence of the chlorin carriers or catalysts as ordinarily used, i. e. iodin chlorid, phosphorus, aluminum chlorid, etc., the reaction does not proceed satisfactorily to the symmetrical trichlorhydrin. On the contrary, with this procedure, isomeric compounds are formed in large proportion, which prevent a good yield of the symmetrical trichlorhydrin. Furthermore, the reaction is extremely slow, and it is practically impossible to completely separate the catalyst or chlorin carrier used from the product by repeated distillations. We have found, however, that these objectionable features may be overcome by the use of certain gaseous sulfur compounds, as catalysts or chlorin carriers. We have found that when small proportions are used of sulfur dioxid, sulfur chlorids or sulfuryl chlorid as the catalyst, there is a great improvement in the speed of the reaction and the chlorination proceeds practically quantitatively to the formation of trichlorhydrin according to the equation

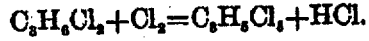

The dry hydrochloric acid leaves the solution as a gas together with the sulfur dioxid, leaving a product of high purity which may easily be separated from the unchanged propylene chlorid, if any be present, by a simple distillation. The speed of reaction may still further be increased by performing the operation under the influence of actinic light, that is, in direct sunlight or in the rays of a flaming arc or ultra violet light.

We have found that the various gaseous sulfur compounds referred to are all extremely effective, sulfur dioxid being perhaps best adapted for the purpose. A preferred method for carrying out the reaction is to add sulfur dioxid and chlorin in separate streams to the propylene chlorid in the presence of direct sunlight or the rays of a flaming arc, the propylene chlorid being contained within a suitable glass vessel. A second method is to mix the sulfur dioxid with the chlorin and pass the mixture through propylene chlorid.

The process may be carried out at room temperature or at higher temperature, if desired. The quantity of the sulfur compound required is extremely small. We have found that sulfur dioxid is effective in the proportion of one-half of one per cent. of the chlorin added to the propylene chlorid.

We have found that the process described may be effectively practised on a commercial scale with the advantageous features that the speed of reaction is increased, the production of isomeric compounds is eliminated, and that the reaction proceeds smoothly without explosions.

What we claim is:—

1. A process of producing trichlorhydrin, which comprises adding chlorin to propylene chlorid in the presence of a gaseous sulfur compound, as a catalyst.

2. A process of producing trichlorhydrin, which comprises adding chlorin to propylene chlorid in the presence of sulfur dioxid, as a catalyst.

3. A process of producing a chlorin substitution product of propylene, which comprises adding chlorin to propylene chlorid in the presence of a gaseous sulfur compound as a catalyst, and separating the product formed from any unchanged propylene chlorid by distillation.

4. A process of producing a chlorin substitution product of propylene, which comprises adding chlorin to propylene chlorid in the presence of a gaseous sulfur compound, the process being carried out under the influence of actinic light.

5. A process of producing a chlorin substitution product of propylene, which comprises adding chlorin, and a gaseous sulfur compound in separate streams to propylene chlorid, in the presence of actinic light.

6. A process of producing trichlorhydrin, which comprises adding chlorin to propylene chlorid in the presence of a gaseous sulfur compound in a proportion not exceeding one per cent. of the chlorin added.

This specification signed and witnessed this 10th day of August, 1920.

HAROLD F. SAUNDERS.

Witnesses:
GEORGE M. GREEN,
JAS. J. CAPANO.

This specification signed and witnessed this 27th day of August, 1920.

LESLIE T. SUTHERLAND.

Witnesses:
THOMAS LONERGAN,
M. J. TAYLOR.